United States Patent [19]
Nakajima et al.

[11] Patent Number: 4,520,079
[45] Date of Patent: May 28, 1985

[54] MAGNETIC RECORDING MEDIUM

[75] Inventors: Kaoru Nakajima, Izumi; Seiichi Miyai, Tagajyo, both of Japan

[73] Assignee: Sony Corporation, Tokyo, Japan

[21] Appl. No.: 509,443

[22] PCT Filed: Oct. 15, 1982

[86] PCT No.: PCT/JP82/00410
§ 371 Date: Jun. 14, 1983
§ 102(e) Date: Jun. 14, 1983

[87] PCT Pub. No.: WO83/01528
PCT Pub. Date: Apr. 28, 1983

[30] Foreign Application Priority Data

Oct. 15, 1981 [JP] Japan ................................ 56-164667

[51] Int. Cl.$^3$ ................................................. G11B 5/70
[52] U.S. Cl. ................................ 428/694; 252/62.54; 427/44; 427/54.1; 427/128; 428/900; 428/522; 360/134; 360/135; 360/136
[58] Field of Search ............... 428/694, 695, 900, 522, 428/425.9, 407; 427/44, 54.1, 128; 252/62.54; 360/134–136

[56] References Cited

U.S. PATENT DOCUMENTS

| 4,404,253 | 9/1983 | Kohler | 428/694 |
| 4,407,901 | 10/1983 | Miyatsuka | 428/900 |
| 4,411,957 | 10/1983 | Tokuda | 428/900 |
| 4,415,630 | 11/1983 | Kubuta | 428/900 |
| 4,420,531 | 12/1983 | Tokuda | 428/323 |
| 4,444,838 | 4/1984 | Yamada | 428/425.9 |

FOREIGN PATENT DOCUMENTS

| 30680 | 3/1978 | Japan | 252/62.54 |
| 80598 | 7/1978 | Japan | 252/62.54 |
| 2054622A | 2/1981 | United Kingdom | 428/694 |

Primary Examiner—Ellis P. Robinson
Attorney, Agent, or Firm—Hill, Van Santen, Steadman & Simpson

[57] ABSTRACT

The magnetic recording medium according to the invention contains as a binder a modified polymer prepared by graft polymerizing with a polymerizable unsaturated compound having a sulfonic group or a metal sulfonate group onto a polymer through irradiation. The modified polymer provides a good binding of magnetic powder because of the presence of the sulfonic group or the metal sulfonate group and improves the dispersibility and packing properties of the magnetic powder. The magnetic recording medium thus shows excellent durability. Further, since the modified polymer can be produced by graft polymerization utilizing irradiation, the kind of polymer which may be used in the method of manufacturing the magnetic recording medium according to the invention extends over such a wide range that the magnetic recording medium may be manufactured by an industrially practical process.

4 Claims, No Drawings

MAGNETIC RECORDING MEDIUM

TECHNICAL FIELD

The present invention relates to a magnetic recording medium and, more particularly, to a magnetic recording medium having a superior durability.

BACKGROUND ART

In order to enhance the durability of a magnetic recording medium, there has been employed a method, for example, of providing an improved binding of magnetic powder to a binder using binder having a high compatibility with the magnetic powder, thus improving dispersibility and packing properties to decrease the rubbing-off of the powder. In this method, it has been proposed that there be employed as a binder a polymer which is modified by the polymerization of its copolymeric ingredients highly compatible with the magnetic powder, thereby improving the binding property of the binder to the magnetic powder. This method, however, requires that all the copolymeric ingredients are capable of being polymerized. Even if this requirement is met, a binder containing a desired amount of copolymeric ingredients cannot be produced or a block copolymer is produced in the absence of a proper relative polymerization ratio, so that conditions of manufacture are significantly limited. This method is accordingly less valuable and less practical in industrial applications.

DISCLOSURE OF INVENTION

The object of the present invention is to provide a magnetic recording medium which has a superior durability by the employment of a binder comprising a modified polymer. The modified polymer binder to be employed in the present invention is produced by the modification of a polymer conventionally used as a binder for magnetic recording media through its graft polymerization with a polymerizable unsaturated compound containing a sulfonic group or a metal sulfonate group through irradiation. Such a binder may be produced by causing organic free radicals to be generated through exposure of a graph polymerizable polymer to radiation such as gamma rays, electron beams or the like, and thereafter allowing the free radicals to polymerize with the polymerizable unsaturated compounds. Thus, the polymer to be modified or a trunk polymer to be employed as a binder in the present invention can be any one which can generate free radicals upon being irradiated and which is not degraded by irradiation. It is to be noted that, since any organic material without exception can produce free radicals if radiation having a high penetrating power is used, and since a polymer likely to be degraded by such radiation can produce enough free radicals to react with the polymerizable unsaturated compound even if the radiation is applied in a small dose under conditions which control degradation, the kind of polymer which can be modified for use with this method extends over a wide range. As a polymer to which the aforementioned method can be applied, there may be mentioned preferably a polymer having a molecular weight ranging from about 10,000 to about 100,000, such as vinyl chloride-vinyl acetate copolymer, vinyl chloride-vinyl propionate copolymer, vinyl chloride-vinyl acetate-vinyl alcohol copolymer, vinyl chloride-vinyl propionate-vinyl alcohol copolymer, vinyl chloride-vinyl acetate-maleic acid copolymer, vinyl chloride-vinylidene chloride copolymer, vinyl chloride-acrylonitrile copolymer, acrylic ester-acrylonitrile copolymer, acrylic ester-vinylidene chloride copolymer, methacrylic ester-vinylidene chloride copolymer, methacrylic ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-acrylic acid copolymer, acrylonitrile-butadiene-methacrylic acid copolymer, polyvinyl butyral, cellulose derivative, styrene-butadiene copolymer, polyester resin, phenolic resin, epoxy resin, thermosetting polyurethane resin, urea resin, melamine resin, alkyd resin, urea-formaldehyde resin or a mixture thereof or the like.

The radiation to be used to irradiate the aforementioned polymer for the generation of free radicals may be, for example, gamma rays, an electron beam or the like. The irradiation dose is preferably within the range of about 0.1 to 10 Mrad.

The polymerizable unsaturated compound to be graft polymerized with the polymer binder treated by the aforementioned radiation may be any compound having a polymerizable unsaturated bond and a sulfonic group or a metal sulfonate group. Its representatives are unsaturated compounds including an unsaturated sulfoalkyl carboxylic acid such as 2-sulfoalkylmethacrylic acid and so on, an aliphatic sulfonic acid metal salt such as sodium ethylenesulfonate, and an unsaturated compound such as a metal salt of an aliphatic sulfonic acid, e.g., a (metha)acrylamide derivative containing a metal sulfonate group such as 2-acrylamido-2-methylpropanesulfonic acid and so on, and a metal salt of an aromatic sulfonic acid such as sodium styrene-sulfonate and so on. Such an unsaturated compound but having an additional substituent different from those aforementioned may also be used as the polymerizable unsaturated compound according to the present invention. The amount of the polymerizable unsaturated compound to the trunk polymer is preferably in the range from 0.1 to 10 parts by weight with respect to 100 parts by weight of the polymer. Where the amount of the polymerizable unsaturated compound is too small, the effect of the sulfonic group and the metal sulfonate group upon being introduced into the polymer on its compatibility with the magnetic powder is so insufficient that dispersibility and packing properties cannot be provided to the desired extent. Where the amount of the polymerizable unsaturated compound is too large, solubility of the modified polymer binder in a solvent is rendered poor, or it becomes so insoluble that compatibility with other binders is rendered poor. In the case where it is employed for a magnetic paint, it presents the disadvantage that its viscosity becomes extremely poor to a practically inapplicable extent.

The modification by reacting the aforementioned polymerizable unsaturated compound with a conventional polymer binder treated by irradiation is preferably carried out by the graft polymerization method. Graft polymerization may be conducted in a conventional manner.

The binder comprising the modified polymer to be used in accordance with the present invention can exhibit a sufficient effect in admixture with the aforementioned conventional binder. If the modified binder is used in admixture with the conventional binder, the modified binder must be contained in an amount of at least about 1% by weight based on the total binder amount so that a desired effect may be obtained.

The modified polymer binder to be used in accordance with the present invention may be used in a system in which a polyfunctional isocyanate compound is combined or in a thermosetting system in which the conventional binder is combined with the polyfunctional isocyanate compound.

The magnetic powder may be any one which is conventionally employed for magnetic recording media. It may be, for example, an oxide magnetic powder such as gamma-$Fe_2O_3$, $Fe_3O_4$, iron oxide in an intermediate oxide state between gamma-$Fe_2O_3$ and $Fe_3O_4$, Co-containing gamma-$Fe_2O_3$, Co-containing $Fe_3O_4$, Co-containing iron oxide in an intermediate oxide state between gamma-$Fe_2O_3$ and $Fe_3O_4$, the aforementioned iron oxide containing further one or more metal elements (particularly a transition metal element), the aforementioned iron oxide containing a coating layer composed mainly of a Co oxide or a hydroxide, $CrO_2$, $CrO_2$ with a $Cr_2O_3$ layer formed at the surface area by the reduction treatment, and so forth, and a ferromagnetic fine powder such as a metal such as Fe, Co, Ni and so forth and an alloy such as an Fe-Co alloy, an Fe-Ni alloy, an Fe-Co-Ni alloy, a Co-Ni-P alloy, a Co-Ni-Fe-B alloy, an Fe-Ni-Zn alloy, an Fe-Mn-Zn alloy, an Fe-Co-Ni-P alloy and so forth. A magnetic paint comprising the modified polymer binder according to the present invention and magnetic powder may additionally contain aluminum oxide, chromium oxide, silicon oxide or the like as an abrasive; carbon black or the like as an antistatic agent; and molybdenum disulfide, graphite, silicone oil, olive oil or the like as a lubricant.

A substrate material for a non-magnetic substrate on which a magnetic layer is formed by the magnetic paint comprising the aforesaid composition may be, for example, a polyester such as polyethylene terephthalate or the like, polyolefin such as polypropylene or the like, a cellulose derivative such as cellulose triacetate, cellulose diacetate or the like, a polycarbonate, a polyvinyl chloride, a polyimide, a metal such as aluminum, copper or the like, paper or the like.

A solvent capable of being used for this preparation of the magnetic coating may include, for example, a ketone such as acetone, methyl ethyl ketone, methyl isobutyl ketone, cyclohexanone or the like; an alcohol such as methanol or the like; an ester such as methyl acetate, ethyl acetate, butyl acetate, ethyl butyrate or the like; a glycol ether such as ethylene glycol dimethyl ether, ethylene glycol monoethyl ether, dioxane or the like; an aromatic hydrocarbon such as benzene, toluene, xylene or the like; an aliphatic hydrocarbon such as hexane, heptane or the like; and a mixture thereof or the like.

The magnetic recording medium produced by the aforementioned method can provide a favorable binding effect between the binder and the magnetic powder and eventually between the magnetic powder and the non-magnetic substrate. It also has improved properties in respect of dispersibility and packing properties of the magnetic powder, thereby reducing the amount of rubbing-off and improving durability.

The present invention will be described further by way of examples.

EXAMPLE 1

A modified polyurethane binder was prepared by mixing 100 parts by weight of a polyurethane binder (tradename "N-2304"; manufactured by Nippon Polyurethane Kogyo K.K.) with 5 parts by weight of sodium ethylenesulfonate, forming the mixture in a sheet form having a thickness of about 100μ, and irradiating it with an electron beam of 5 Mrad.

With the modified polyurethane binder, a magnetic paint having the following composition was prepared:

modified Polyurethane—100 parts by weight
gamma-$Fe_2O_3$—400 parts by weight
squalane—9 parts by weight
$Cr_2O_3$—4 parts by weight
methyl ethyl ketone—500 parts by weight
methyl isobutyl ketone—500 parts by weight The paint composition containing the above-mentioned ingredients was milled to give a magnetic paint, and the magnetic paint was coated on a polyester base film having a thickness of 10μ to a thickness of 4μ. The film was dried and then cut into magnetic tapes.

EXAMPLE 2

A paint having the following composition was deposited on a polyester base film having a thickness of 16μ to a thickness of 4μ, and magnetic tapes were prepared in the same manner as in Example 1. The modified polyurethane used in this example was substantially identical to that used in Example 1.

gamma-$Fe_2O_3$—400 parts by weight
modified polyurethane—30 parts by weight
vinyl chloride-vinyl acetate-vinyl alcohol copolymer (tradename "VAGH"; Union Carbide Corp.)—70 parts by weight
squalane—9 parts by weight
$Cr_2O_3$—4 parts by weight
methyl ethyl ketone—500 parts by weight
methyl isobutyl ketone—500 parts by weight

COMPARATIVE EXAMPLE 1

Using the non-modified polyurethane binder (tradename "N-2304") in place of the modified polyurethane binder, magnetic tapes were prepared in the same manner as in Example 1.

COMPARATIVE EXAMPLE 2

Magnetic tapes were prepared in the same manner as in Example 2 with the exception that the non-modified polyurethane binder (tradename "N-2304") was used in place of the modified polyurethane binder.

The magnetic tapes prepared according to the aforementioned Examples and Comparative Examples were measured for Bm, Rs, gloss, rubbing-off rating, and still. The results are shown in the following table. In this measurement, gloss was determined with a commercially available gloss meter by measuring an amount of reflected light arising from incident light at an incident angle of 75°. The larger the value thereof, that is, the closer to 100%, the better the surface quality. The rubbing-off rating was determined by an amount of powder attached to a magnetic head, tape guide and so on after running the tape. The durability was defined as the time required for the reduction of output signals from an initial level to a predetermined level by repeated scanning of the same portion of a magnetic tape with the magnetic head of a household VTR.

TABLE

|  | Bm | Rs (%) | Gloss (%) | Rubbing-Off Ratings | Durability (minutes) |
| --- | --- | --- | --- | --- | --- |
| Example 1 | 1450 | 84 | 98 | good | 970 |
| Example 2 | 1430 | 82 | 103 | good | 850 |
| Comparative Example 1 | 1350 | 74 | 68 | bad | 780 |
| Comparative Example 2 | 1310 | 76 | 76 | bad | 800 |

We claim:

1. In a magnetic recording medium comprising a magnetic layer containing magnetic powder and a binder attached to a non-magnetic substrate, the improvement which comprises:

employing in the binder of at least 1% by weight of the total amount of binder of a graft polymer produced by reacting a graft polymerizable polymer with a polymerizable unsaturated compound containing a sulfonic group or a metal sulfonate under the influence of ionizing radiation, said polymerizable unsaturated compound is present in an amount of from 0.1 to 10 parts by weight per 100 parts by weight of said graft polymerizable polymer.

2. A magnetic recording medium according to claim 1 wherein said graft polymerizable polymer has a molecular weight in the range from 10,000 to 100,000.

3. A magnetic recording medium according to claim 1 wherein said ionizing radiation is an electron beam.

4. A magnetic recording medium according to claim 1 wherein said ionizing radiation is applied at a dosage in the range of 0.1 to 10 Mrad.

* * * * *